United States Patent
Kim

(10) Patent No.: US 7,528,341 B2
(45) Date of Patent: May 5, 2009

(54) SCRIBING APPARATUS, SUBSTRATE CUTTING APPARATUS EQUIPPED WITH THE SCRIBING APPARATUS, AND SUBSTRATE CUTTING METHOD USING THE SUBSTRATE CUTTING APPARATUS

(75) Inventor: Jung Sik Kim, Chungcheongnam-do (KR)

(73) Assignee: LG Display Co., Ltd., Seoul (KR)

( * ) Notice: Subject to any disclaimer, the term of this patent is extended or adjusted under 35 U.S.C. 154(b) by 663 days.

(21) Appl. No.: 11/169,857

(22) Filed: Jun. 30, 2005

(65) Prior Publication Data

US 2006/0097022 A1    May 11, 2006

(30) Foreign Application Priority Data

Nov. 5, 2004   (KR) ............... 10-2004-0089706

(51) Int. Cl.
    *B23K 26/08*   (2006.01)
(52) U.S. Cl. .............. 219/121.67; 65/112; 83/155; 219/121.72
(58) Field of Classification Search ........... 225/93.5, 225/96; 83/152, 155, 155.1; 219/121.67, 219/121.72, 121.82; 65/105, 112; 414/752.1, 414/758
See application file for complete search history.

(56) References Cited

U.S. PATENT DOCUMENTS

| | | | | |
|---|---|---|---|---|
| 4,184,472 A * | 1/1980 | Benedicto et al. .............. 83/152 |
| 4,316,565 A * | 2/1982 | Hodgkinson et al. ........ 225/96.5 |
| 5,492,582 A * | 2/1996 | Ide et al. .................... 65/112 |
| 6,058,132 A * | 5/2000 | Iso et al. .................. 219/121.74 |
| 6,204,469 B1 * | 3/2001 | Fields et al. ............ 219/121.63 |
| 6,220,056 B1 * | 4/2001 | Ostendarp .................... 65/175 |
| 6,291,794 B1 * | 9/2001 | Dulaney .................. 219/121.74 |
| 6,747,725 B2 | 6/2004 | Chae et al. |
| 6,945,443 B2 * | 9/2005 | Matsuzawa .................... 225/96 |
| 7,128,516 B2 * | 10/2006 | Sugiyama et al. ........... 414/758 |
| 2003/0147035 A1 | 8/2003 | Chae et al. |
| 2003/0226832 A1 * | 12/2003 | Liu et al. ................ 219/121.69 |
| 2004/0001177 A1 * | 1/2004 | Byun et al. .................. 349/187 |
| 2004/0056008 A1 * | 3/2004 | Choo et al. ............. 219/121.67 |
| 2005/0029239 A1 * | 2/2005 | Matsumoto et al. ..... 219/121.72 |
| 2005/0134759 A1 * | 6/2005 | Tseng .......................... 349/58 |
| 2005/0202596 A1 * | 9/2005 | Fukuyo et al. ............... 438/113 |
| 2006/0232085 A1 * | 10/2006 | Nagasawa et al. ........... 294/64.1 |
| 2007/0164072 A1 * | 7/2007 | Nishio ........................ 225/93.5 |

FOREIGN PATENT DOCUMENTS

| CN | 1436642 A | 8/2003 |
|---|---|---|
| JP | 57-109918 A | 7/1982 |

(Continued)

*Primary Examiner*—Geoffrey S Evans
(74) *Attorney, Agent, or Firm*—Birch, Stewart, Kolasch & Birch LLP

(57) ABSTRACT

A scribing apparatus simultaneously performs scribing processes for a TFT substrate and a C/F substrate in the same location, thereby efficiently utilizing equipment spaced and achieving enhanced productivity. A substrate cutting apparatus is equipped with the scribing apparatus, and a substrate cutting method uses the substrate cutting apparatus. The scribing apparatus includes a stage for attracting a first mother substrate including first and second conjoined substrates, a scribing belt for holding a second mother substrate including conjoined third and fourth substrates, and a head unit for forming cracks in the second substrate of the first mother substrate or in the third substrate of the second mother substrate

17 Claims, 12 Drawing Sheets

FOREIGN PATENT DOCUMENTS

| | | | |
|---|---|---|---|
| JP | 59-21535 A | * | 2/1984 |
| JP | 6-226472 A | * | 8/1994 |
| JP | 2004-66636 A | | 3/2004 |
| JP | 2004-224601 A | | 8/2004 |
| JP | 2004-271945 A | | 9/2004 |
| WO | WO-2004/067243 | * | 8/2004 |

* cited by examiner

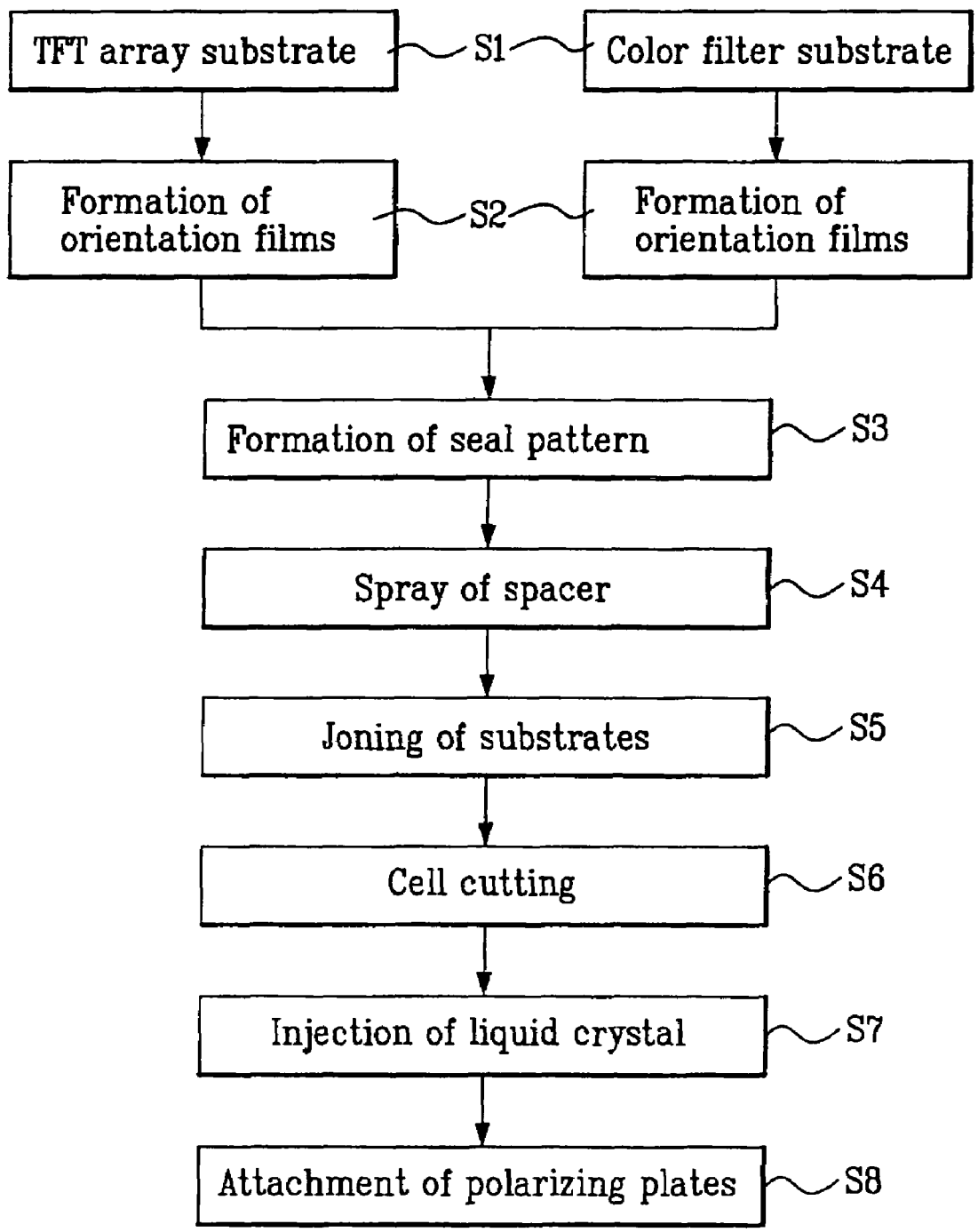

SCRIBING APPARATUS, SUBSTRATE CUTTING APPARATUS EQUIPPED WITH THE SCRIBING APPARATUS, AND SUBSTRATE CUTTING METHOD USING THE SUBSTRATE CUTTING APPARATUS

This application claims priority under 35 U.S.C. 119 of Korean Patent Application No. P2004-89706, filed on Nov. 5, 2004 which is hereby incorporated by reference as if fully set forth herein.

BACKGROUND OF THE INVENTION

1. Field of the Invention

The invention relates to a scribing apparatus for a liquid crystal display that occupies little space and enhances productivity, a substrate cutting apparatus equipped with the scribing apparatus, and a substrate cutting method using the substrate cutting apparatus.

2. Discussion of the Related Art

LCD devices display a desired image by individually supplying image data signals according to liquid crystal cells arranged in a matrix array, thereby controlling respective light transmittances of the liquid crystal cells.

The manufacture of such LCD devices utilizes a large-area mother substrate on which thin film transistor (TFT) array substrates are formed. Another large-area mother substrate, on which color filter (C/F) substrates are formed, is used. In order to achieve an improvement in throughput, the mother substrates are joined together to simultaneously form multiple of liquid crystal panels. Then, it is necessary to perform a process to cut the joined mother substrates into unit liquid crystal panels.

The liquid crystal panel cutting process generally includes a scribing process to form a crack to a desired depth in a surface of a mother substrate by using a scribing wheel made of a diamond material having a hardness higher than that of the mother substrate, which is made of, for example, glass. A breaking process applies a mechanical force to the mother substrate, thereby cutting the mother substrate.

FIG. 1 shows a sectional view illustrating a related art LCD device. This LCD device is manufactured in accordance with the following method. For simplicity, the following description will be given only in conjunction with one pixel region.

FIG. 1 shows a gate electrode 11 made of a conductive material such as metal that is initially formed on a first transparent substrate 10 at a predetermined region. A gate insulating film 12 made of a silicon nitride (SiNx) or silicon oxide (SiO$_2$) is then formed over the entire upper surface of the first substrate 10 including the gate electrode 11.

Thereafter, an active layer 13 made of amorphous silicon is formed on the gate insulating film 12 at a region corresponding to the gate electrode 11. An ohmic contact layer 14 is formed on the active layer 13 at regions corresponding to respective lateral edge portions of the active layer 13. The ohmic contact layer 14 is formed from doped amorphous silicon.

Source and drain electrodes 15 and 16 are made of a conductive material such as metal and are subsequently formed on the ohmic contact layer 14. The gate electrode 11 together with the source and drain electrodes 15 and 16 constitute a thin film transistor T.

Although not shown, the gate electrode 11 connects to a gate line, and the source electrode 15 connects to a data line. The gate line and data line cross each other and define a pixel region.

A protective film 17 is then formed over the entire upper surface of the first substrate 10 including the source and drain electrodes 15 and 16. The protective film 17 is made from silicon nitride, silicon oxide, or an organic insulating material. The protective film 17 has a contact hole 18 that exposes a predetermined portion of the surface of the drain electrode 16.

Thereafter, a pixel electrode 19 made of a transparent conductive material is formed on the protective film 17 at the pixel region. The pixel electrode 19 connects to the drain electrode 16 via the contact hole 18.

A first orientation film 20 is then formed over the entire upper surface of the first substrate 10 including the pixel electrode 19. The first orientation film 20 is made of, for example, polyimide, and has a surface on which the molecules of the first orientation film 20 orient in a predetermined direction.

A second transparent substrate 31 is arranged over the first substrate 10 while being vertically spaced apart from the first substrate 10 by a predetermined distance.

A black matrix 32 is formed on a lower surface of the second substrate 31 at a region corresponding to the thin film transistor T of the first substrate 10. Although not shown, the black matrix 32 also covers a region other than the pixel electrode 19.

A color filter 33 is then formed on the second substrate 31 beneath the black matrix 32. Color filters are usually arranged in the form of repeated filter patterns of red (R), green (G), and blue (B), each of which corresponds to one pixel region.

A common electrode 34 made of a transparent conductive material is subsequently formed on the second substrate 31 beneath the color filter 33. A second orientation film 35 is then formed on the second substrate 31 beneath the common electrode 34. The second orientation film 35 is made of, for example, polyimide, and has a surface on which the molecules of the second orientation film 35 orient in a predetermined direction.

The first orientation film 20 and the second orientation film 35A seal a liquid crystal layer 40 between them.

Manufacturing the above-described LCD device uses an array substrate fabrication process involving the formation of thin film transistors and pixel electrodes on a substrate to fabricate an array substrate, a color filter substrate fabrication process involving formation of color filters and a common electrode on another substrate to fabricate a color filter substrate, a liquid crystal panel fabrication process involving arrangement of the fabricated substrates, injection and sealing of a liquid crystal material, and attachment of polarizing plates to fabricate a liquid crystal panel.

FIG. 2 shows a flow chart illustrating a related art LCD manufacturing method.

FIG. 2 shows that in this method, a thin film transistor (TFT) array substrate including TFTs, and a color filter substrate including color filters are first prepared (S1).

The TFT array substrate is fabricated by repeatedly performing processes of depositing a thin film and pattering the deposited thin film. In this case, the number of masks used for patterning of thin films in the fabrication of the TFT array substrate corresponds to the number of processes used in the fabrication of the TFT array substrate. Currently, research is underway to reduce the number of masks to thus reduce the manufacturing costs.

The color filter substrate is fabricated by sequentially forming a black matrix for preventing light from leaking through a region other than pixel regions, R, G, and B color filters, and the common electrode. The color filters may be formed using a dyeing method, a printing method, a pigment dispersion method, an electro-deposition method, or the like. Currently, the pigment dispersion method finds wide use.

Afterwards, an orientation film is formed over each substrate to determine the initial alignment direction of the liquid crystal molecules (S2).

Coating a polymer thin film, and treating the surface of the polymer thin film such that the molecules of the polymer thin film on the treated surface orient in a predetermined direction form the orientation film. Generally, polyimide-based organic materials are used for the orientation film. For the orientation method, a rubbing method is generally used.

In the rubbing method, the orientation film is rubbed in a predetermined direction using a rubbing cloth. This rubbing method is suitable for mass production because of the ease of the orientation treatment. Also, the rubbing method advantageously achieves stable orientation and easy control of the pretilt angle.

An optical orientation method has recently been developed and practically used that achieves orientation using polarized beams.

Next, a seal pattern is formed at one of the two substrates (S3). The seal pattern is arranged around the region where the image is to be displayed. The seal pattern has a port for injection of a liquid crystal material, and the seal pattern prevents the injected liquid crystal material from leaking.

The seal pattern is made by forming a thermosetting resin layer having a predetermined pattern. A screen printing method uses a screen mask. A seal dispenser method using a dispenser may be used.

The screen printing method, which has process convenience, is mainly used. However, the screen printing method also has drawbacks in that poor quality product may be produced because the screen mask may come into contact with the orientation film. Furthermore, the screen mask cannot easily cope with increasing substrate sizes. For this reason, there is a gradual substitution of a seal dispenser method for the screen printing method.

Subsequently, spacers of a predetermined size are sprayed on one of the either TFT array substrate or the color filter substrate to maintain an accurate and uniform space between the two substrates (S4).

The methods for spraying spacers include a wet spray method where spacer material is sprayed while being mixed with alcohol, and a dry spray method where spacer material is sprayed undiluted. For the dry spray method, there includes an electrostatic spray method using static electricity, and an ionic spray method using pressurized gas. Since LCDs are easily damaged by static electricity, the ionic spray method is mainly used.

Thereafter, the two substrates of the LCD, i.e., the TFT array substrate and color filter substrate, are arranged such that the seal pattern becomes interposed between the substrates. In this state, the seal pattern is cured under pressure to join the substrates (S5). In this case, the orientation films of the substrates face each other, and the pixel electrodes and color filters have a one-to-one correspondence.

Next, the joined substrates are cut into single liquid crystal panels (S6).

Multiple liquid crystal panels, each of which will become one LCD device, are generally formed on one substrate sheet and are then separated into individual panels in order enhance manufacturing efficiency and reduce manufacturing costs.

The liquid crystal panel cutting process includes a scribing process to form a crack in a surface of each substrate using a scribing wheel made of a diamond material having a hardness higher than that of the substrate. The substrate can be made of, for example, glass. Then, a breaking process positions a breaking bar at a portion of the substrate where the crack is formed and applies a predetermined pressure to the breaking bar, thereby cutting the substrate in the direction along which the crack extends.

Subsequently, a liquid crystal material is injected between the two substrates of each liquid crystal panel (S7). A vacuum injection method that utilizes a pressure difference between the interior and exterior of the liquid crystal panel is mainly used to inject the liquid crystal material. Micro air bubbles may be present in the liquid crystal material injected into the interior of the liquid crystal panel, and bubbles may thus be present in the interior of the liquid crystal panel, thereby causing the liquid crystal panel to have poor quality. In order to prevent such a problem, it is accordingly necessary to perform a de-bubbling process in which the liquid crystal is maintained under a vacuum for a prolonged time to remove bubbles by outgassing.

After the liquid crystal injection is complete, the injection port is sealed to prevent the liquid crystal from leaking out through the injection port. Coating an ultraviolet-setting resin over the injection port, and irradiating ultraviolet light at the coated resin to thereby set the coated resin achieve sealing the injection port.

Next, polarizing plates are attached to the outer surfaces of the liquid crystal panel, and driving circuits are then connected to the liquid crystal panel. Thus, an LCD device is completely manufactured (S8).

FIGS. 3A to 3F illustrate sequential steps of a related art process for cutting a mother substrate for separating the mother substrate into unit liquid crystal panels, using a related art substrate cutting apparatus, through sectional views and plan views.

The process for cutting a joined mother substrate (scribing and breaking processes) is usually carried out by using a substrate cutting apparatus. In FIGS. 3A to 3F, a mother substrate (1,000 mm×1,200 mm) is illustrated on which six 18.1" liquid crystal panels are arranged.

In the cutting process, a joined mother substrate 52 is first loaded on a table 51 included in a loader, as shown in FIG. 3A.

The joined mother substrate 52 includes a TFT substrate 52a and a color filter (C/F) substrate 52b.

In FIG. 3A, the upper figure shows a sectional view illustrating the mother substrate 52 loaded on the table 51, and the lower figure is a plan view illustrating the mother substrate 52 on the table 51 when viewed from the top.

FIG. 3B shows that the mother substrate 52 is then inverted so that the TFT substrate 52a of the mother substrate 52 faces upward.

Then, a wheel 53 is aligned along a selected separation line on the TFT substrate 52a. The wheel 53 is made of a diamond material having a hardness higher than that of the material of the substrate, for example, glass. The wheel 53 is then moved along the separation line while rotating to form a crack having a predetermined depth and extending in a long or short-axis direction (indicated by arrows in the drawing). This operation is repeated until cracks corresponding to all separation lines on the TFT substrate 52a are formed.

Thereafter, the mother substrate 52 is inverted such that the C/F substrate 52b of the mother substrate 52 faces upward, as shown in FIG. 3C. A breaking bar 54 is then arranged on the C/F substrate 52b.

Subsequently, a predetermined pressure is applied by the breaking bar 54, thereby completely opening the cracks. As a result, the TFT substrate 52a cuts along the cracks, so that the TFT substrate 52a separates into unit liquid crystal panels.

Next, the wheel 53 is aligned with a selected separation line on the C/F substrate 52b, as shown in FIG. 3D.

The wheel 53 is then moved along the separation line while rotating to form a crack having a predetermined depth and extending in a long or short-axis direction (indicated by arrows in the drawing). This operation is repeated until cracks corresponding to all separation lines on the C/F substrate 52b are formed.

Thereafter, the mother substrate 52 is then inverted such that the TFT substrate 52a of the mother substrate 52 faces upward, as shown in FIG. 3E. The breaking bar 54 is then arranged on the TFT substrate 52a of the inverted mother substrate 52. A predetermined pressure is then applied to the breaking bar 54 to thereby cause the C/F substrate 52b to separate into the unit liquid crystal panels.

As shown in FIG. 3F, separated pieces of the mother substrate corresponding to respective unit liquid crystal panels are then unloaded. That is, the separated substrate pieces are simultaneously lifted from the table 51 by using a suction cup assembly (not shown). The substrate pieces are then fed to a station for subsequent processing.

FIG. 4 illustrates the arrangement of scribing and breaking devices included in the conventional substrate cutting apparatus.

FIG. 4 shows the related art substrate cutting apparatus that includes a loader 70 for receiving a mother substrate, where the mother substrate includes a TFT substrate 60 and a C/F substrate 65 joined together. The mother substrate is loaded while being seated on the loader 70. A first scriber 71 forms cracks in the mother substrate seated on the loader 70 along separation lines on the TFT substrate 60 of the mother substrate. A first breaker 72 applies a force to the cracks formed by the first scriber 71 at the side of the mother substrate opposite to the TFT substrate 60, thereby cutting the TFT substrate 60. The substrate cutting apparatus also includes a second scriber 73 for forming cracks in the mother substrate seated on the loader 70 along separation lines on the C/F substrate 65 of the mother substrate. A second breaker 74 applies a force to the cracks formed by the second scriber 73 at the side of the mother substrate opposite to the C/F substrate 65, thereby cutting the C/F substrate 65 to completely separate the mother substrate into substrate pieces corresponding to unit liquid crystal panels. The substrate cutting apparatus further includes a suction cup assembly 75 for simultaneously lifting and feeding the separated substrate pieces, a separation table 76 for separating the separated substrate pieces from the suction cup assembly 75, and an unloader 77 for transferring the separated substrate pieces from the separation table 76 to a station for subsequent processing.

The suction cup assembly 75 moves between the second breaker 74 and the separation table 76 to feed the substrate pieces, i.e., the unit liquid crystal panels, completely separated by the second breaker 74 to the separation table 76. The substrate cutting apparatus further includes conveying rollers 78 and a robot 79 to feed the mother substrate to a desired station during the scribing and breaking processes.

However, the above-described related art substrate cutting apparatus and method have numerous problems.

That is, the recent trend of LCD devices is to provide a larger display, so that it is necessary to use scribing and breaking devices adapted to an increased size for the processing of larger substrates. As a result, these large scale scribing and breaking devices must occupy a large part of a clean room. To this end, scribing and breaking processes for cutting of TFT and C/F substrates are respectively carried out at different locations. As a result, excessive space is required and the productivity degrades.

SUMMARY OF THE INVENTION

Accordingly, the invention is directed to a scribing apparatus, a substrate cutting apparatus equipped with the scribing apparatus, and a substrate cutting method using the substrate cutting apparatus that substantially obviate one or more problems due to limitations and disadvantages of the related art.

One object of the invention, in part, is to provide a scribing apparatus that may simultaneously perform scribing processes for a TFT substrate and a C/F substrate in the same location, thereby efficiently securing a space for occupation of equipment and achieving enhanced productivity. A substrate cutting apparatus may be equipped with the scribing apparatus, and a substrate cutting method may use the substrate cutting apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The invention, in part, pertains to a scribing apparatus that includes a stage for attracting a first mother substrate including conjoined first and second substrates; a scribing belt for holding a second mother substrate including conjoined third and fourth substrates; and a head unit for forming cracks in the second substrate of the first mother substrate or in the third substrate of the second mother substrate.

The invention, in part, pertains to a substrate cutting apparatus that includes a feeding robot for feeding a mother substrate that includes a conjoined first substrate and second substrate; a substrate conveyer for conveying the mother substrate fed from the feeding robot; a scriber for forming cracks having a predetermined depth in the first or second substrate of the mother substrate conveyed by the substrate conveyor along separation lines on the first or second substrate; a breaker for receiving the crack-formed mother substrate from the scriber, and separating the mother substrate into unit liquid crystal panels; and a panel inverter for inverting the separated liquid crystal panels.

The invention, in part, pertains to a substrate cutting method that includes placing a first mother substrate including first and second conjoined substrates over a vertically and laterally movable stage. The stage is fed to a scriber that forms first cracks in the second substrate of the first mother substrate along separation lines. Then the stage returns to an original position, a conveyor belt moves upward, and first mother substrate transfers to the conveyor belt. The conveyor belt moves downward, transferring the first mother substrate to a scribing belt of the scriber, and forming second cracks in the first substrate of the first mother substrate along separation lines. Then, the first mother substrate formed with the first and second cracks is fed to a breaking belt that separates the first mother substrate into unit liquid crystal panels.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 shows a flow chart illustrating a related art LCD manufacturing method;

FIGS. 7A to 7H show schematic views explaining a substrate cutting method carried out using the substrate cutting apparatus having the configuration of FIG. 6.

DETAILED DESCRIPTION OF THE INVENTION

Reference will now be made in detail to the preferred embodiments of the invention, examples of which are illustrated in the accompanying drawings. Wherever possible, the same reference numbers will be used throughout the drawings to refer to the same or like parts.

Figure 1:
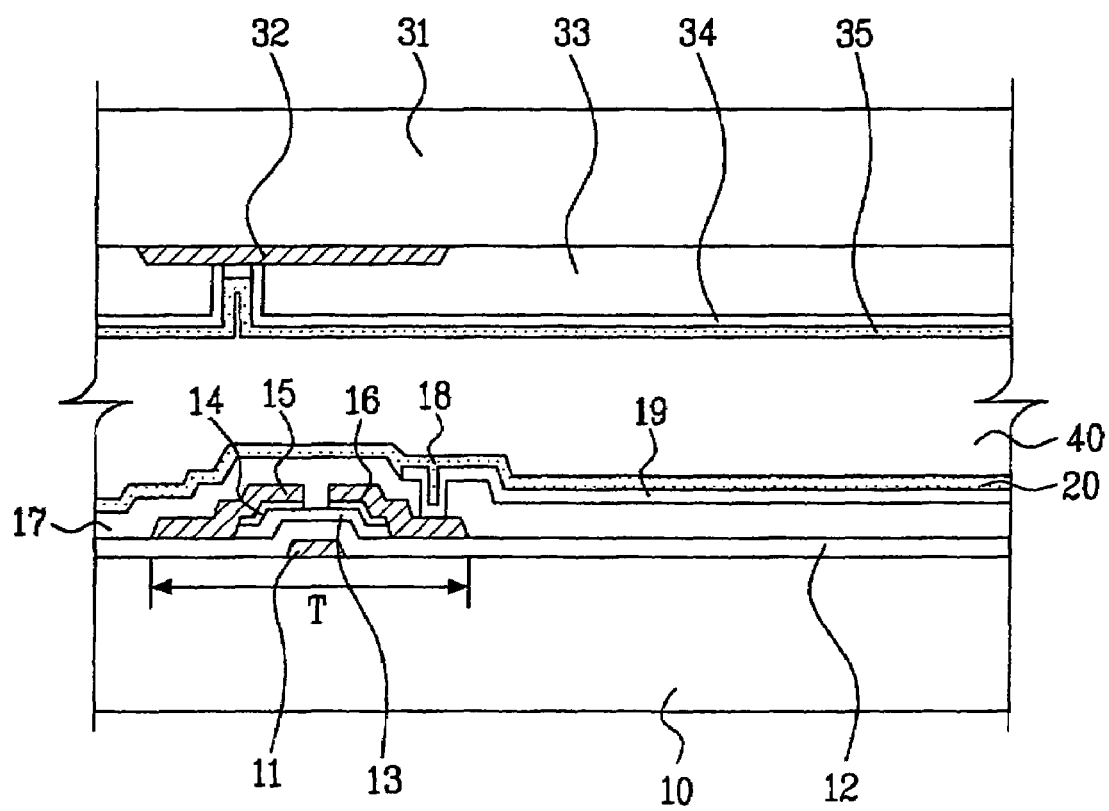
FIG. 1 shows a sectional view illustrating a related art LCD device.
Figure 3A:
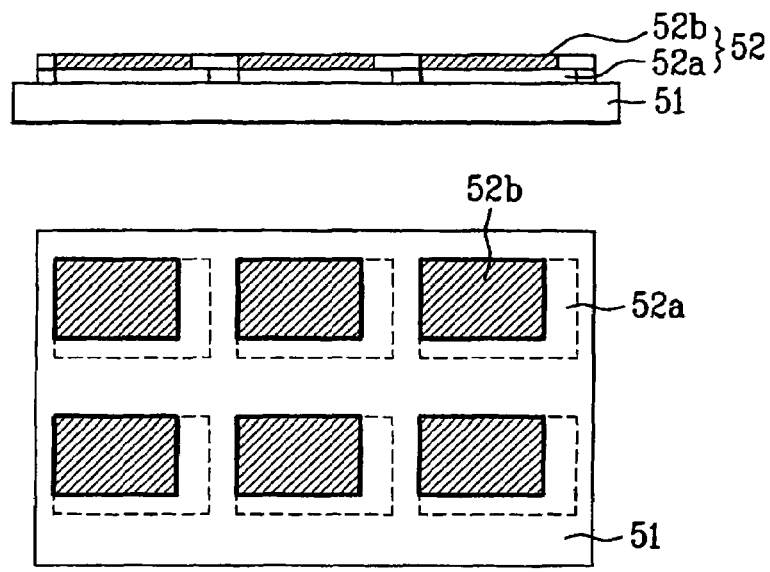
FIGS. 3A to 3F illustrate sequential steps of a process for cutting a mother substrate for separation of the mother substrate into unit liquid crystal panels, using a related art substrate cutting apparatus, through sectional views and plan views.
Figure 3B:
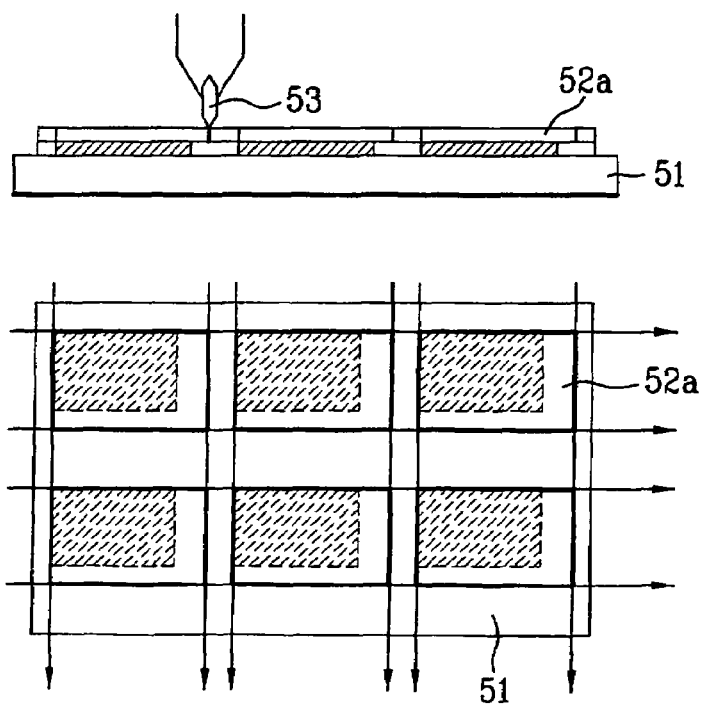
Figure 3C:
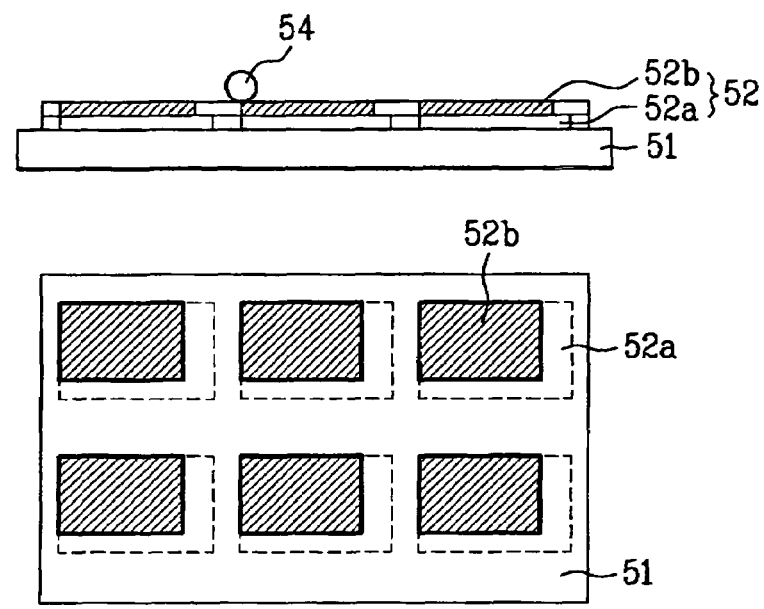
Figure 3D:
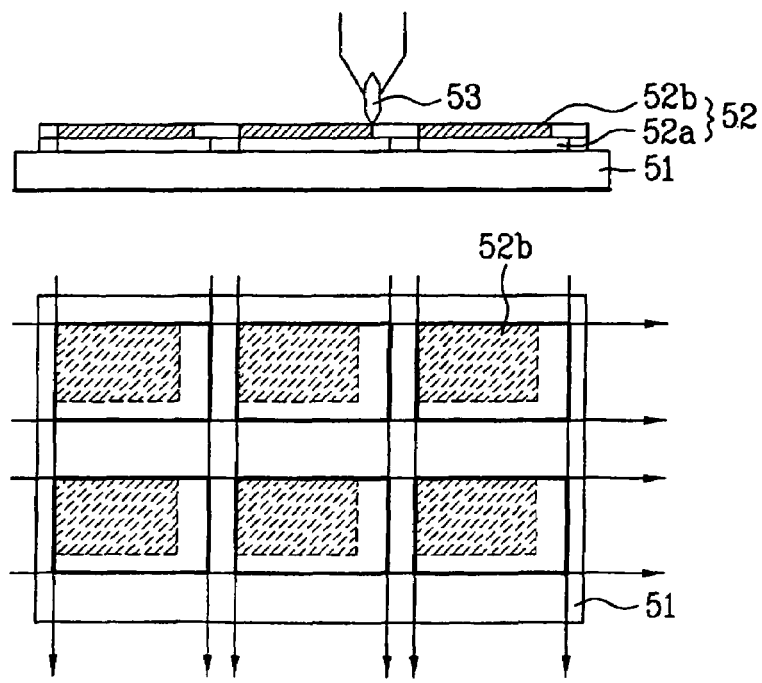
Figure 3E:
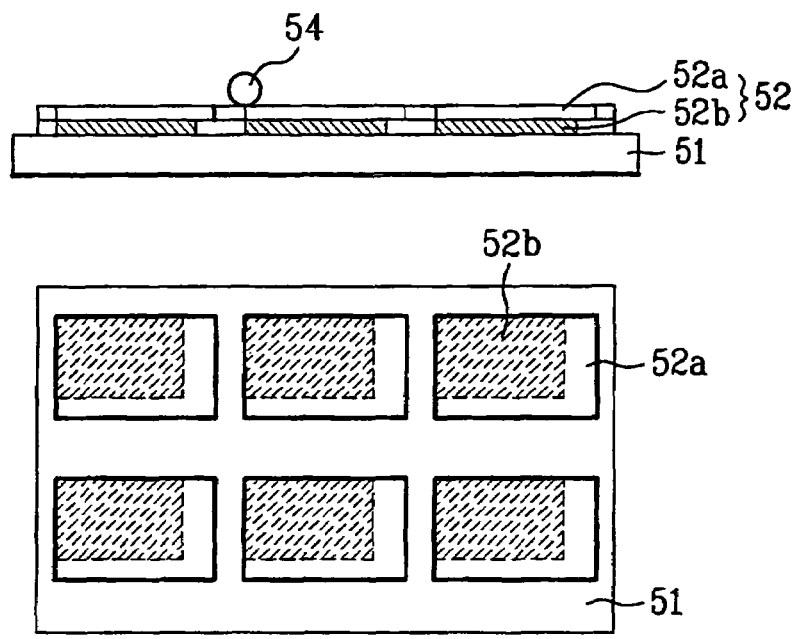
Figure 3F:
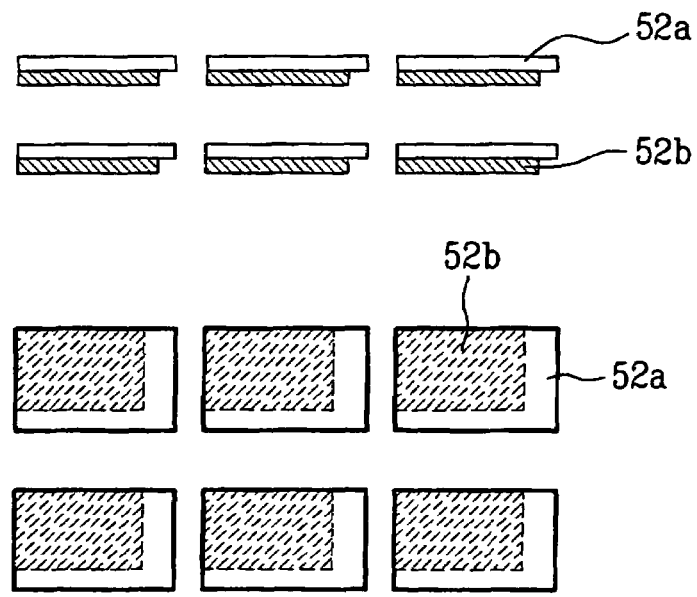
Figure 4:
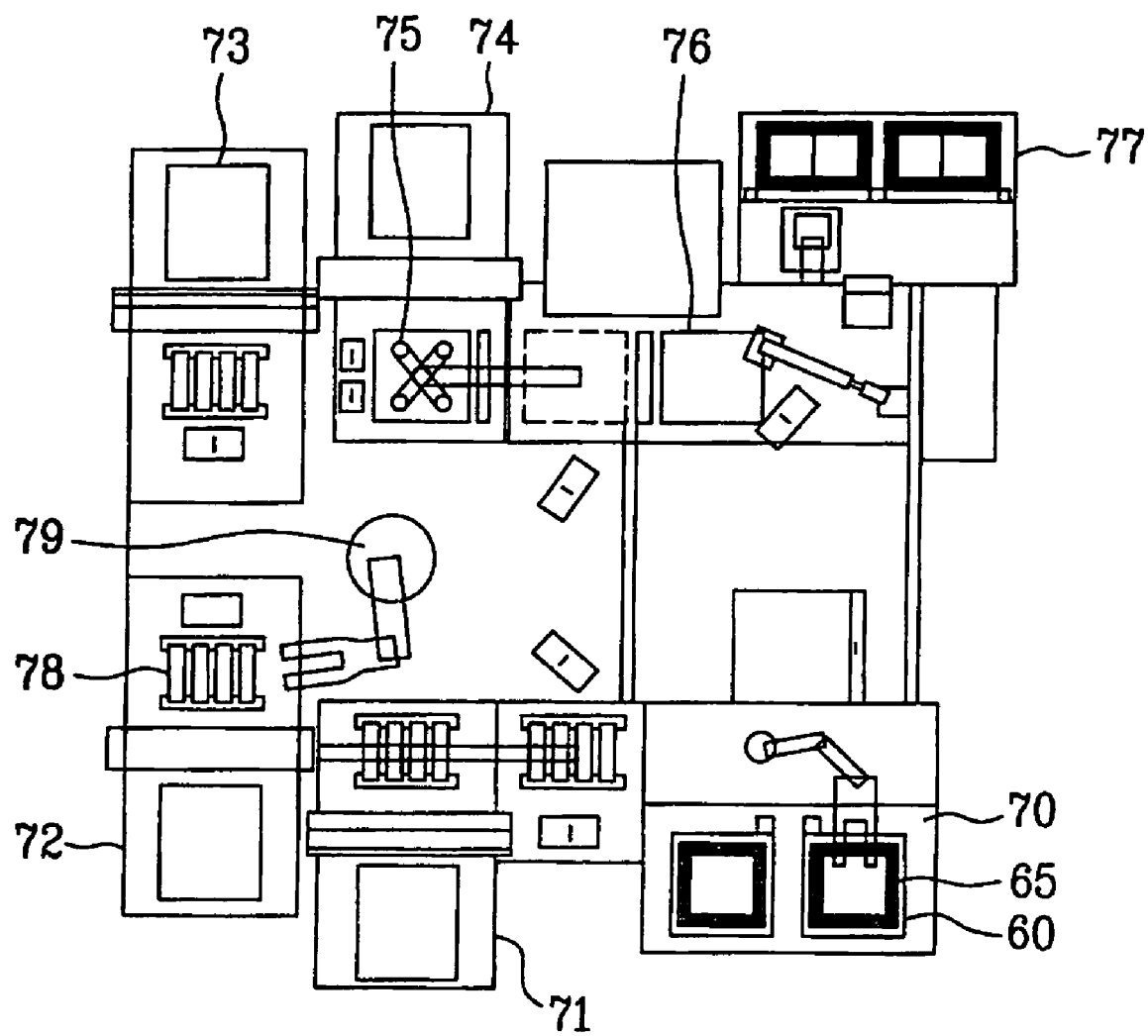
FIG. 4 illustrates the arrangement of scribing and breaking devices included in a related art substrate cutting apparatus.
Figure 5:
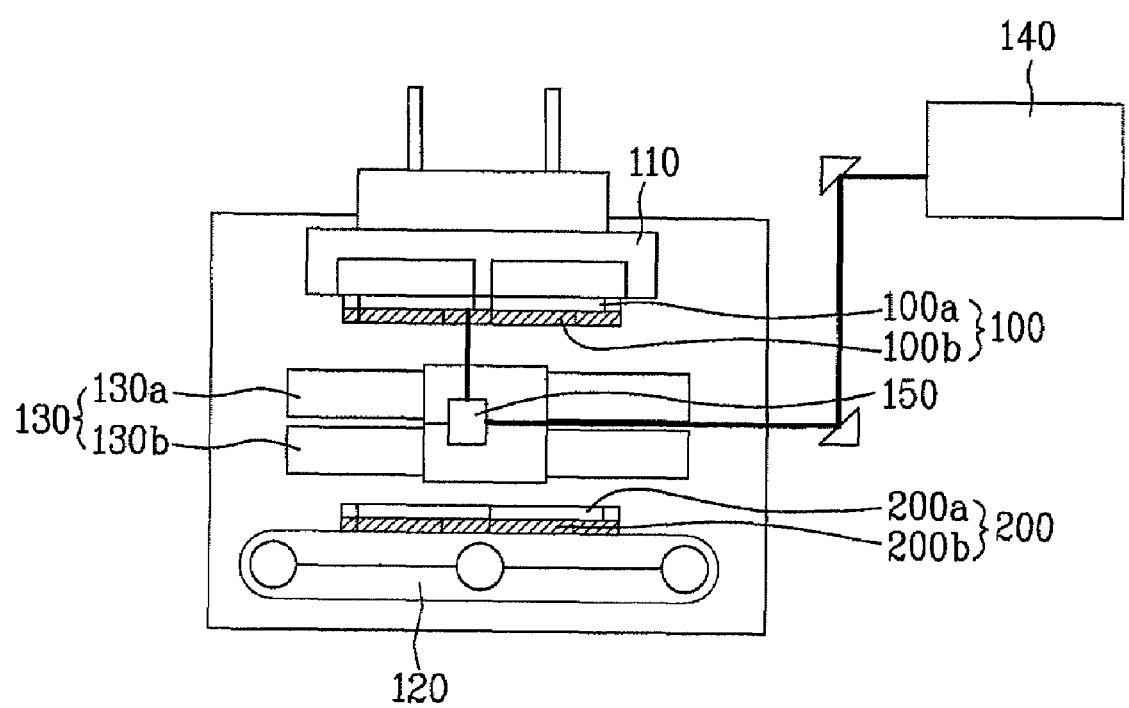
FIG. 5 shows a schematic view illustrating a scribing apparatus according to a preferred embodiment of the invention.

FIG. 5 shows a schematic view illustrating a scribing apparatus according to a preferred embodiment of the invention.

FIG. 5 shows a scribing apparatus that includes a stage 110 for fixing first mother substrate 100 that includes a TFT substrate 100a and a C/F substrate 100b bonded to each other. The first mother substrate 100 is fixed in the stage 110 having the C/F substrate 100b downwardly exposed. The scribing apparatus also includes a scribing belt 120 for holding a second mother substrate 200 that includes a TFT substrate 200a and a C/F substrate 220b bonded to each other. The second mother substrate 200 is placed on the scribing belt 120 such that the TFT substrate 200a is upwardly exposed. The scribing apparatus further includes a head unit 130 for selectively irradiating a laser at the C/F substrate 100b of the first mother substrate 100 or the TFT substrate 200a of the second mother substrate 200, thereby forming cracks having a predetermined depth. A laser generator 140 generates the laser beam, and directs the generated laser light to the head unit 130.

The head unit 130 includes a first head 130a for forming cracks having a predetermined depth in the C/F substrate 100b of the first mother substrate 100. A second head 130b for forms cracks having a predetermined depth in the TFT substrate 200a of the second mother substrate 200.

The scribing apparatus also includes a reflector 150 for controlling the direction of the laser beam generated by the laser generator 140 to cause the laser beam to selectively irradiate through the first head 130a or second head 130b. Also, the laser can irradiate through both heads simultaneously.

The reflector 150 includes a controller (not shown) to control the direction of the laser to selectively form cracks on the first mother substrate 100 or second mother substrate 200.

Also, the first mother substrate 100 is fixed in the stage 110 having the C/F substrate 100b downwardly exposed. The scribing belt 120 holds the first mother substrate 100 such that the TFT substrate 100a of the first mother substrate 100 is upwardly exposed. The head unit 130 selectively irradiates the laser at the C/F substrate 100b of the first mother substrate 100 or the TFT substrate 100a of the first mother substrate 100, thereby forming cracks having a predetermined depth.

The first head 130a forms cracks having a predetermined depth in the C/F substrate 100b of the first mother substrate 100 fixed in the stage 110. The second head 130b forms cracks having a predetermined depth in the TFT substrate 100a of the first mother substrate 100 placed on the scribing belt 120.

Meanwhile, the head unit 130 may be rotatable through an angle of 180°. In this case, the head unit 130 is rotated in accordance with a control signal from the controller so as to form cracks having a predetermined depth on a selected one of the first and second mother substrates 100 and 200 loaded on the scribing apparatus.

Although the head unit 130 has been described as a head unit adapted to irradiate a laser in the illustrated preferred embodiment of the invention, a head unit equipped with a diamond wheel may be used. Alternately, any appropriate scribing and cutting device may be used.

Figure 6:
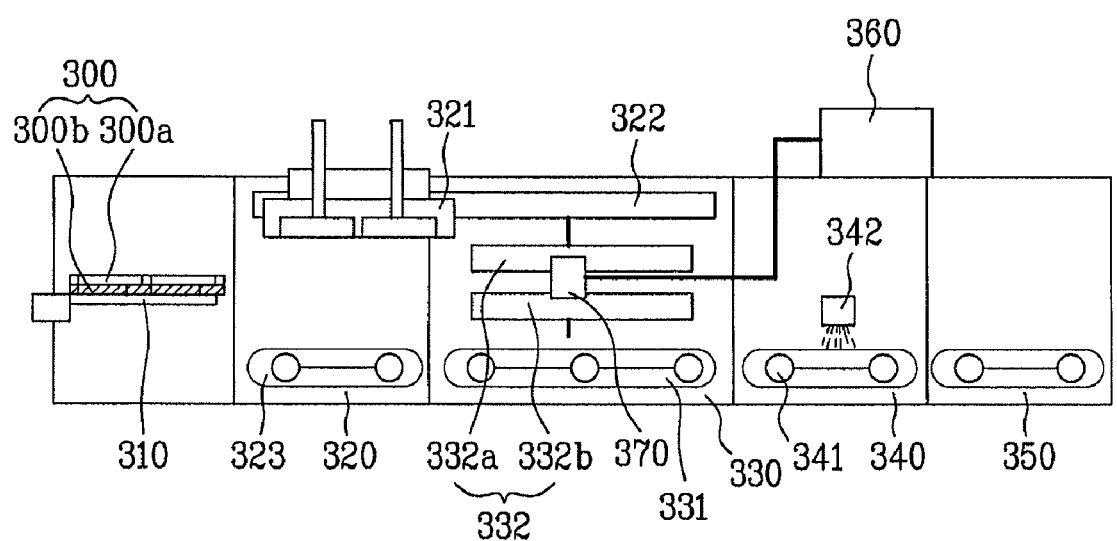
FIG. 6 shows a schematic view illustrating a substrate cutting apparatus according to a preferred embodiment of the invention.

FIG. 6 illustrates a substrate cutting apparatus according to a preferred embodiment of the invention.

FIG. 6 shows a substrate cutting apparatus that includes a feeding robot 310 for feeding a mother substrate 300 that includes a TFT substrate 300a and a C/F substrate 300b joined to each other. A substrate conveyer 320 conveys the mother substrate 300 fed from the feeding robot 310. The substrate cutting apparatus also includes a scriber 330 for forming cracks having a predetermined depth in the TFT substrate 300a and C/F substrate 300b of the mother substrate 300, which is conveyed by the substrate conveyor 320 along separation lines on the TFT substrate 300a and C/F substrate 300b. A breaker 340 receives the scribed mother substrate 300 from the scriber 330, and the breaker 340 separates the mother substrate 300 into unit liquid crystal panels. Also, a panel inverter 350 inverts the separated liquid crystal panels.

A stage 321 is arranged over the substrate conveyor 320. The stage 321 uses a vacuum to attract and adhere the mother substrate 300 fed by the feeding robot 310, so as to fix the mother substrate 300. The stage 321 is reciprocally laterally movable between a position over the substrate conveyor 320 and a position over the scriber 330 along a movement path 322. The stage 321 is also vertically movable.

A conveyor belt 323 is arranged beneath the substrate conveyor 320. The conveyor belt 323 vertically moves to receive the mother substrate 300. The scriber 330 includes a scribing belt 331 for receiving the mother substrate 300 from the conveyor belt 323. The scriber 330 moves the mother substrate 300 during the scribing process so that the mother substrate 300 is scribed.

A head unit 332 is arranged between the scribing belt 331 of the scriber 330 and the movement path 322 of the stage 321. The head unit 332 is adapted to form cracks having a predetermined depth in the TFT substrate 300a and C/F substrate 300b of the mother substrate 300 along separation lines on the TFT substrate 300a and C/F substrate 300b.

The head unit 332 is rotatable through an angle of 180°. Accordingly, the head unit 332 can form cracks having a predetermined depth in the C/F substrate 300b of the mother substrate 300, which is adhering to the stage 321, or the head unit 332 can form cracks having a predetermined depth in the TFT substrate 300a of the mother substrate 300 that is laid on the scribing belt 331.

The head unit 332 may include a wheel made of a diamond material, may include a head adapted to irradiate a laser or may include any other appropriate scribing device.

Alternatively, the head unit 332 may include a first head 332a and a second head 332b. In this case, the first head 332a forms cracks having a predetermined depth in the C/F substrate 300b of the mother substrate 300, which is adhering to the stage 321. The second head 130b forms cracks having a predetermined depth in the TFT substrate 300a of the mother substrate 300, which is placed on the scribing belt 331.

The head unit 332 connects to an external laser generator 360 that generates a laser beam. Accordingly, the head unit 332 receives a laser beam generated by the laser generator 360 and selectively irradiates through the first head 332a or second head 332b to thereby form cracks on the TFT substrate 300a or C/F substrate 300b of the mother substrate 300.

The substrate cutting apparatus may further include a reflector 370 for controlling the direction of the laser beam generated by the laser generator 360 to cause the laser beam to selectively irradiate through the first head 332a or second head 332b.

The reflector 370 may be controlled in accordance with an external control signal to cause the laser to be selectively irradiated through the first head 332a or second head 332b, thereby causing cracks to be selectively formed on different mother substrates.

The breaker 340 includes a breaking belt 341 for receiving and holding the mother substrate 300 fed from the scribing belt 331. A hot steam nozzle unit 342 for injects hot steam at the mother substrate 300 lying on the breaking belt 341, thereby separating the mother substrate 300 into unit liquid crystal panels. The nozzle unit 342 is not restricted to steam, and any appropriate gas having sufficient heat capacity can be used.

FIGS. 7A to 7H show schematic views explaining a substrate cutting method carried out using the substrate cutting apparatus having the configuration of FIG. 6.

Figure 7A:
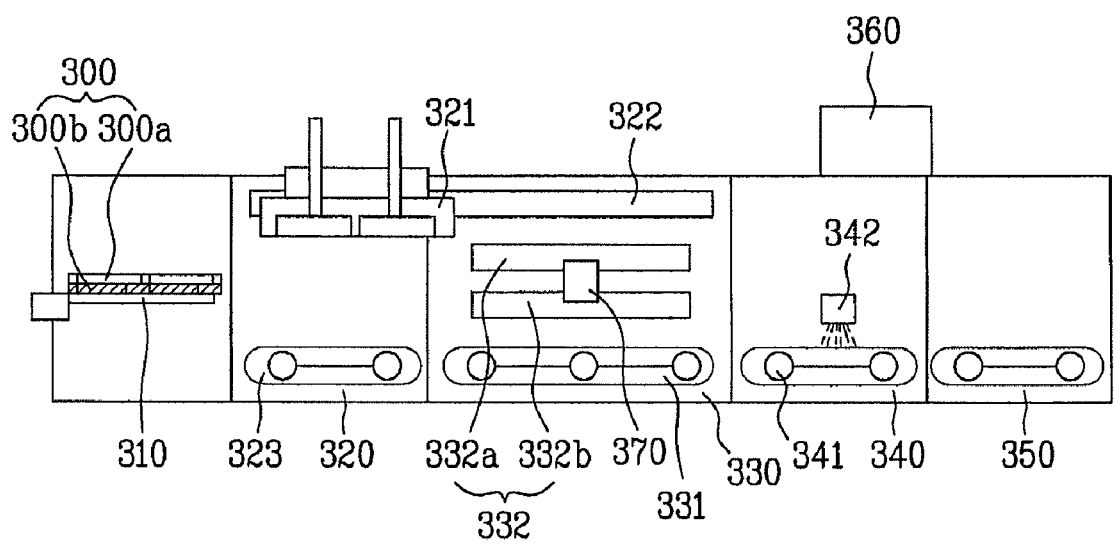

In substrate cutting method according to a preferred embodiment of the invention, a first mother substrate 300, which includes a conjoined TFT substrate 300a and a C/F substrate 300b, is first fed to the substrate conveyor 320 using the feeding robot 310, as shown in FIG. 7A.

Figure 7B:
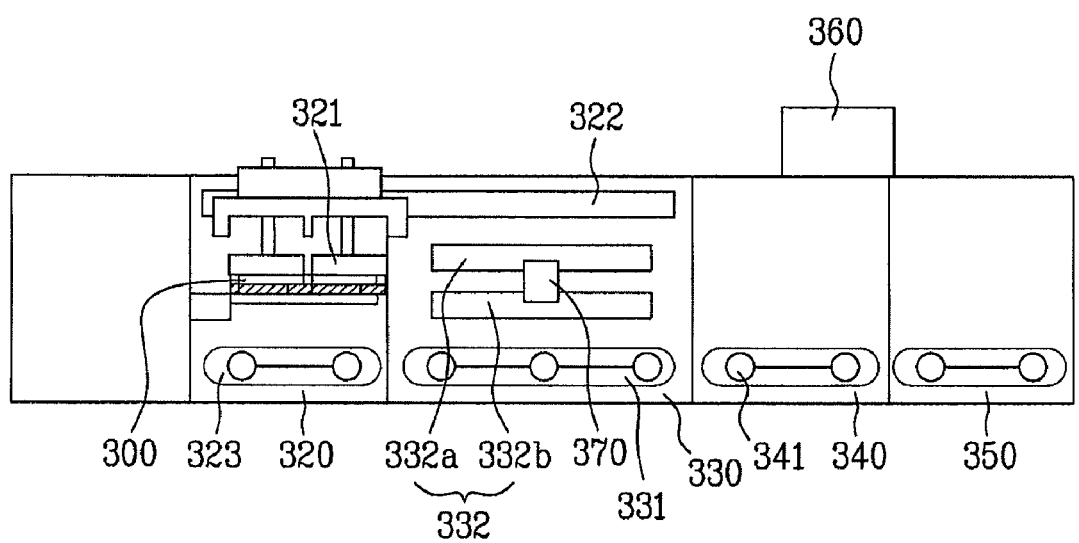

Afterwards, the stage 321, which is vertically and laterally movable, is moved downward to the first mother substrate 300 fed to the substrate conveyor 320 by the feeding robot 310. The stage 321 then picks up the first mother substrate 300 by using a vacuum, and moves the first mother substrate 300 upward, as shown in FIG. 7B.

Figure 7C:
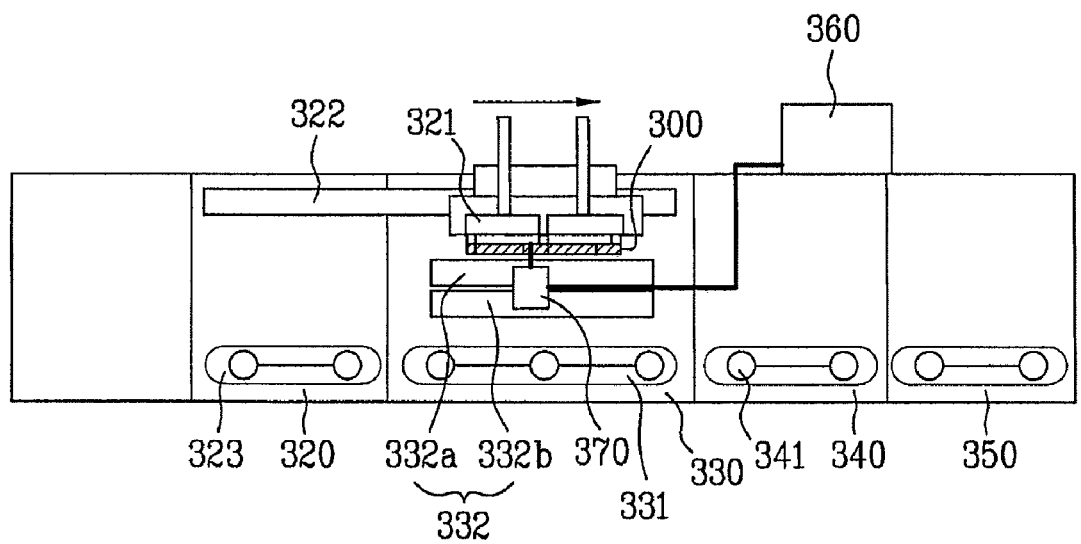

As shown in FIG. 7C, the stage 321, to which the first mother substrate 300 is vacuum-adhered, subsequently moves along the movement path 322 to feed the first mother substrate 300 to the scriber 330.

Next, in the scriber 330, to which the first mother substrate 300 has been fed along the movement path 322, a laser beam irradiates through the first head 332a to the C/F substrate 300b of the first mother substrate 300 along the separation lines on the C/F substrate 300b, thereby forming cracks having a predetermined depth in the C/F substrate 300b. During this exposure process, the substrate 300b does not contact the stage 321.

When using laser energy to form the cracks, a laser generated from the external laser generator 360 is used. The laser is also controlled to irradiate through the first head 332a by manipulating the reflector 370.

Although utilization of a laser has been described in the illustrated preferred embodiment of the invention, cracks, i.e., scribes, may be formed using a wheel made of a diamond material.

Figure 7D:
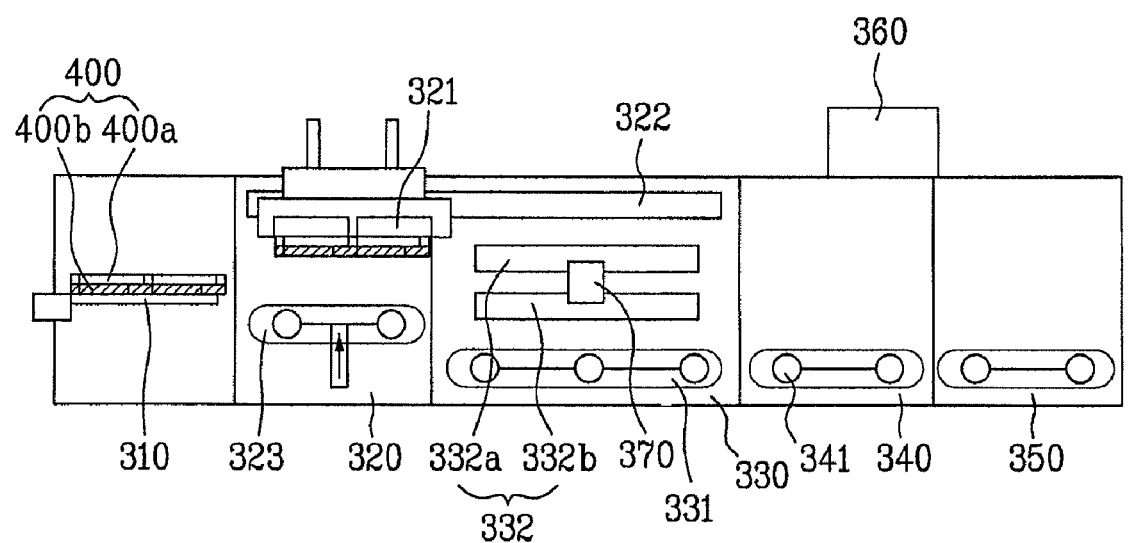

FIG. 7D shows that after completion of the scribing process for the C/F substrate 300b of the first mother substrate 300, the stage 321 returns to an original position while the first mother substrate 300 remains attached to the stage 321.

Following the return to the original position, the stage 321 moves upwardly above the conveyor belt 323 of the substrate conveyor 320. While in this state, the feeding robot 310 is ready to load a second mother substrate 400 that includes a conjoined TFT substrate 400a and C/F substrate 400b.

Figure 7E:
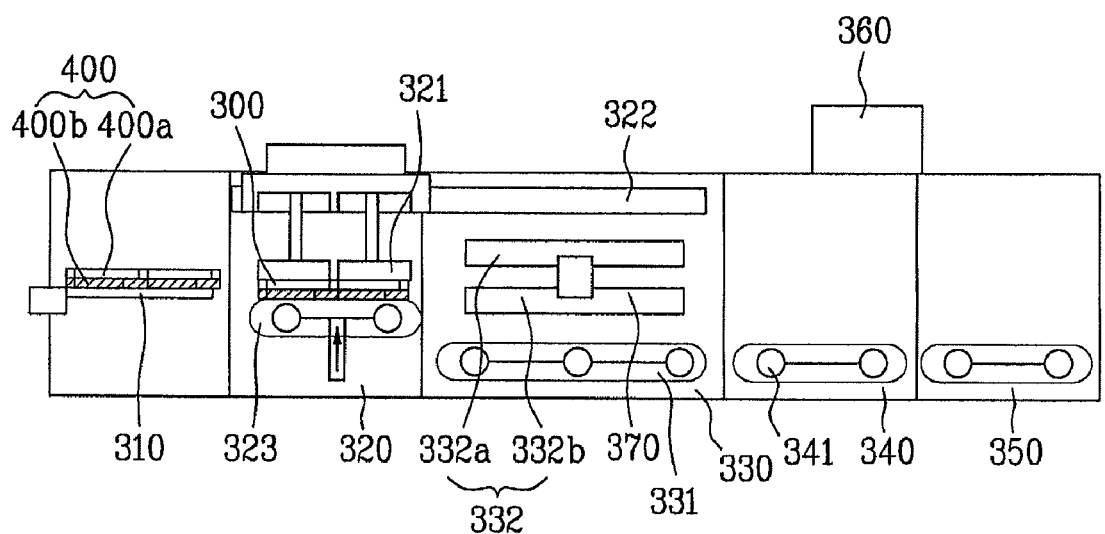

Thereafter, the conveyor belt 323 moves upward, as shown in FIG. 7E. The stage 321 then releases (turns off) the suction force applied to the first mother substrate 300, thereby causing the first mother substrate 300 to lie on the conveyor belt 323.

Figure 7F:
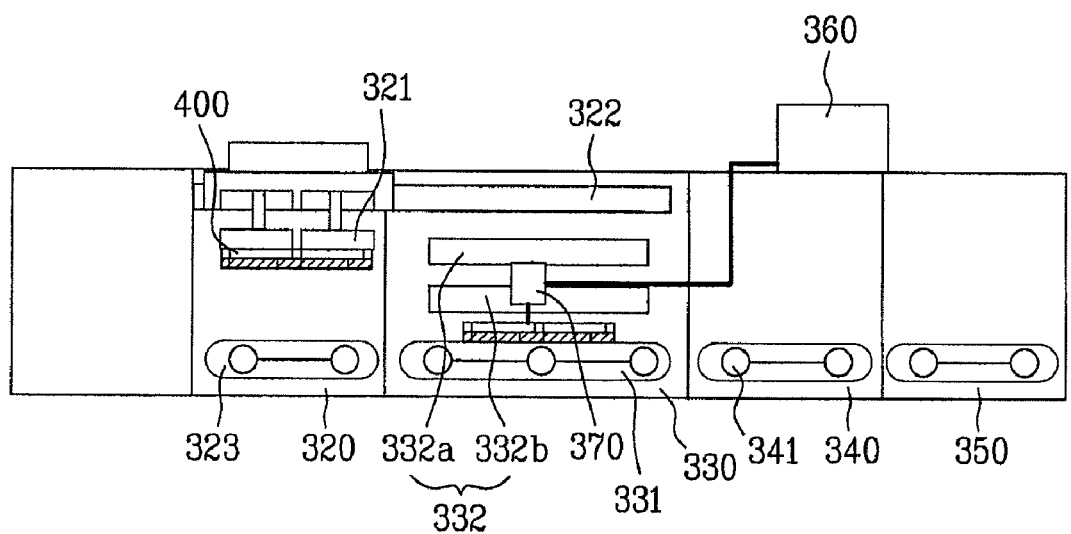

FIG. 7F shows that the conveyor belt 321 subsequently moves downwardly to transfer the first mother substrate 300 to the scribing belt 331 of the scriber 330.

Next, in the scriber 330 where the first mother substrate 300 is laid on the scribing belt 331, a laser irradiates through the second head 332b to the TFT substrate 300a of the first mother substrate 300 along the separation lines on the TFT substrate 300a. Cracks are thereby formed having a predetermined depth in the TFT substrate 300a.

Although the formation of cracks has been described as being achieved by using the first and second heads 332a and 332b in the illustrated preferred embodiment of the invention, cracks may also be formed on the substrate attracted to the stage 321 and the substrate laid on the scribing belt 331 by using a single head unit that can rotate through an angle of 180°.

Next, the feeding robot 310 loads the second mother substrate 400 onto the substrate conveyor 320. The stage 321 of the substrate conveyor 320 then moves downward and picks up the second mother substrate 400 by using a vacuum. Meanwhile, the first mother substrate 300, for which the process of scribing the TFT substrate 300a and C/F substrate 300b has been completed, is transferred to the breaking belt 341 of the breaker 340 by using a feeding operation of the scribing belt 331, as shown in FIG. 7G.

The stage 321, to which the second mother substrate 400 is attracted, is subsequently fed to the scriber 330 along the movement path 322. In the scriber 330, a laser irradiates through the first head 332a to the C/F substrate 400b of the second mother substrate 400 along the separation lines on the C/F substrate 400b. Cracks are thereby formed having a predetermined depth in the C/F substrate 400b.

Meanwhile, a hot gas, preferably hot steam, is injected over the entire surface of the first mother substrate 300 fed to the breaker 340, through the nozzle unit 342, thereby separating the first mother substrate 300 into unit liquid crystal panels.

Figures 7G, 7H:
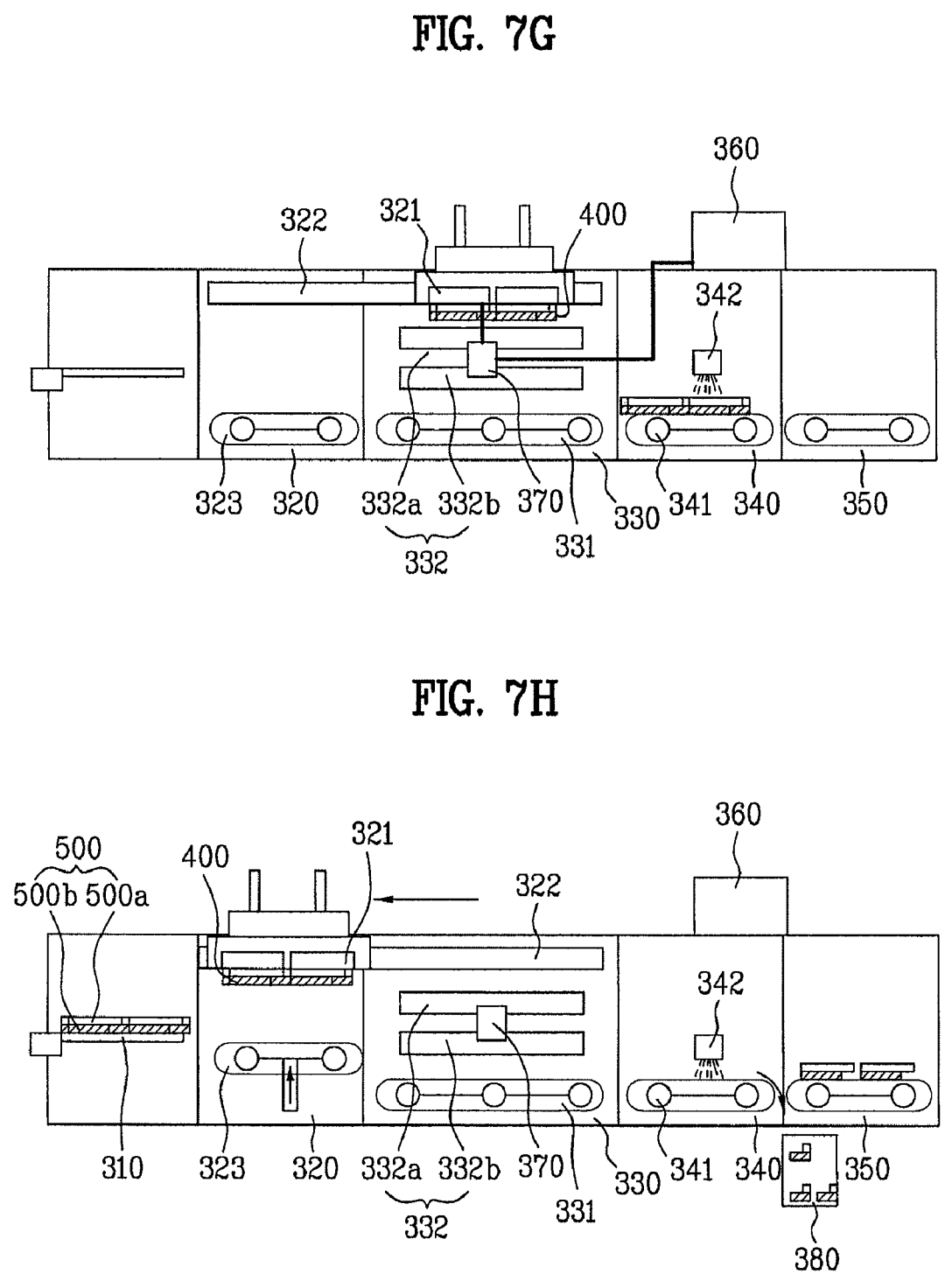

FIG. 7H shows the first mother substrate 300, for which the breaking process has been completed, being fed to the panel inverter 350. Unnecessary separated substrate pieces are dropped into a storage unit 380 arranged at one side of the panel inverter 350.

Subsequently, the feeding robot 310 is ready to load a third mother substrate 500 that includes a TFT substrate 500a and a C/F substrate 500b joined together.

In accordance with the invention, one may perform scribing processes for the TFT substrate of one mother substrate and the C/F substrates of another mother substrate in the scriber 330, respectively, as the operations of FIGS. 7A to 7H are repeated. It is accordingly possible to remarkably reduce the area occupied by the scriber, as compared to related art technology.

The type of laser used for the laser generator 360 is not restricted, and a $CO_2$ laser, YAG laser, femtosecond laser or the like may be used.

As is apparent from the above description, the scribing apparatus, the substrate cutting apparatus equipped with the scribing apparatus, and the substrate cutting method using the substrate cutting apparatus according to the invention have numerous beneficial effects.

Namely, the invention renders it possible to use a single scriber to form cracks on a TFT substrate and a C/F substrate that are included in two identical mother substrates, respectively. Accordingly, it is possible to install an increased number of processing elements in a clean room that has a constant volume. One can thus secure space for equipment for the final cell processing in the clean room. As a result, an improved utilization of the clean room is achieved.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claims is:

1. A scribing apparatus comprising:
   a stage for attracting a first mother substrate that includes first and second conjoined substrates;
   a scribing belt for holding a second mother substrate that includes third and fourth conjoined substrates; and
   a head unit for forming cracks in the second substrate of the first mother substrate or in the third substrate of the second mother substrate
   wherein the stage is arranged over the scribing belt and vertically movable as well as laterally movable along a movement path, and
   wherein the head unit is arranged between the scribing belt and the stage.

2. The scribing apparatus according to claim 1, wherein the head unit is rotatable through an angle of 180°.

3. The scribing apparatus according to claim 1, wherein the head unit comprises:
   a first head for forming the cracks in the second substrate of the first mother substrate; and
   a second head for forming the cracks in the third substrate of the second mother substrate.

4. The scribing apparatus according to claim 3, further comprising:
   a laser generator for generating a laser beam and directing the generated laser beam to the head unit.

5. The scribing apparatus according to claim 4, further comprising:
   a controller for controlling a direction of the laser beam such that the laser is irradiated through the first head or through the second head.

6. The scribing apparatus according to claim 1, wherein the head unit comprises a head adapted to irradiate laser radiation, or a wheel comprising a diamond material.

7. A substrate cutting apparatus comprising:
   a feeding robot for feeding a mother substrate which includes a conjoined first substrate and second substrate;
   a substrate conveyer for conveying the mother substrate fed from the feeding robot;
   a scriber for forming cracks having a predetermined depth in the first and second substrate of the mother substrate conveyed by the substrate conveyor along separation lines on the first and second substrate;
   a breaker for receiving the mother substrate from the scriber, and separating the mother substrate into unit liquid crystal panels; and
   a panel inverter for inverting the separated liquid crystal panels,
   wherein the substrate conveyer comprises a stage for attaching the mother substrate fed by the feeding robot by using a vacuum, and a conveyor belt for feeding the mother substrate to the scriber,
   wherein the scriber comprises a scribing belt and a head unit including a first head and a second head,
   wherein the stage is reciprocally laterally movable along a movement path extending between the substrate conveyer belt and the scriber, and
   wherein the head unit is arranged between the scribing belt and the stage.

8. The substrate cutting apparatus according to claim 7, wherein the scribing belt holds the mother substrate fed from the conveyor belt such that the mother substrate lies over the scribing belt the first head forms the cracks having the predetermined depth in the first substrate of the mother substrate which is attached to the stage after being fed by the substrate conveyor, and the second head forms the cracks having the predetermined depth in the second substrate of the mother substrate which lies over the scribing belt after being fed by the substrate conveyor.

9. The substrate cutting apparatus according to claim 7, wherein the breaker comprises:
   a breaking belt for holding the mother substrate fed from the scriber such that the mother substrate lies over the breaking belt; and
   a nozzle unit for injecting hot gas to the mother substrate lying over the breaking belt, thereby separating the mother substrate into the unit liquid crystal panels.

10. The substrate cutting apparatus according to claim 7, wherein at least one of the stage or the conveyor belt is vertically movable.

11. A substrate cutting method comprising the steps of:
    attracting a first mother substrate including conjoined first and second substrates over a vertically and laterally movable stage; feeding the stage to a scriber, and forming first cracks in the second substrate of the first mother substrate along separation lines;
    returning the stage to an original position of the stage, upwardly moving a conveyor belt, and transferring the first mother substrate to the conveyor belt;
    downwardly moving the conveyor belt, transferring the first mother substrate to a scribing bolt of the scriber, and forming second cracks in the first substrate of the first mother substrate along separation lines;
    feeding the first mother substrate formed with the first and second cracks to a breaking belt;
    placing on the stage a second mother substrate including conjoined third and fourth substrates;
    forming first cracks in the fourth substrate of the second mother substrate along separation lines; and
    separating the first mother substrate fed to the breaking belt into unit liquid crystal panels.

12. The substrate cutting method according to claim 11, wherein the step of separating the first mother substrate into the unit liquid crystal panels is carried out by injecting hot gas at the first mother substrate.

13. The substrate cutting method according to claim 11, wherein the first and second cracks are formed using radiation from a laser.

14. The substrate cutting method according to claim 13, wherein the laser is selected from the group consisting of a $CO_2$ laser, a YAG laser, and a femtosecond laser.

15. The substrate cutting method according to claim 11, wherein the first and second cracks are formed using a wheel.

16. The substrate cutting method according to claim 15, wherein the wheel comprises a diamond material.

17. A scribing apparatus comprising:

a stage for attracting a mother substrate that includes first and second conjoined substrates;

a scribing belt for holding the mother substrate; and a head unit for forming cracks in the first substrate and the second substrate of the first mother substrate, wherein the stage is arranged over the scribing belt and vertically movable as well as laterally moveable along a movement path, and wherein the head unit is arranged between the stage and the scribing belt.

* * * * *